United States Patent [19]

Obara

[11] Patent Number: 5,237,129
[45] Date of Patent: Aug. 17, 1993

[54] SHIELD GROUND ADAPTER FOR KICKPIPES AND STUFFING TUBES

[75] Inventor: Michael Obara, Mystic, Conn.

[73] Assignee: The United States of America as represented by the Secretary of the Navy, Washington, D.C.

[21] Appl. No.: 714,815

[22] Filed: Jun. 13, 1991

[51] Int. Cl.⁵ .......................................... H02G 15/102
[52] U.S. Cl. .................................... 174/65 SS; 174/78
[58] Field of Search .................. 174/65 SS, 78, 35 R

[56] References Cited

U.S. PATENT DOCUMENTS

| | | | |
|---|---|---|---|
| 3,739,076 | 6/1973 | Schwartz | 174/65 SS X |
| 3,830,957 | 8/1974 | Oberdiear | 174/65 SS X |
| 4,547,623 | 10/1985 | Van Brunt et al. | 174/65 SS X |
| 4,904,826 | 2/1990 | Dixon | 174/65 SS |

FOREIGN PATENT DOCUMENTS

| | | | |
|---|---|---|---|
| 2527265 | 1/1976 | Fed. Rep. of Germany | 174/65 SS |
| 760514 | 10/1956 | United Kingdom | 174/65 SS |

Primary Examiner—Leo P. Picard
Assistant Examiner—David A. Tone
Attorney, Agent, or Firm—Michael J. McGowan; Prithvi C. Lall; Michael F. Ooglo

[57] ABSTRACT

A shielded cable passes through a kickpipe in a structural plate member, such as the deck of a ship. The kickpipe has a necked-down portion designed to receive the cable at a point where the cable shielding has been exposed. Axially compressible radially expandable iris, or toroidal, springs are engaged by an adapter nut threadably received inside the kickpipe to create a low impedance ground connection from the cable shielding to the deck. The adapter nut has a cavity for receiving a packing material and a gland nut is received in the adapter cavity to seal the ground connection from the environment.

3 Claims, 1 Drawing Sheet

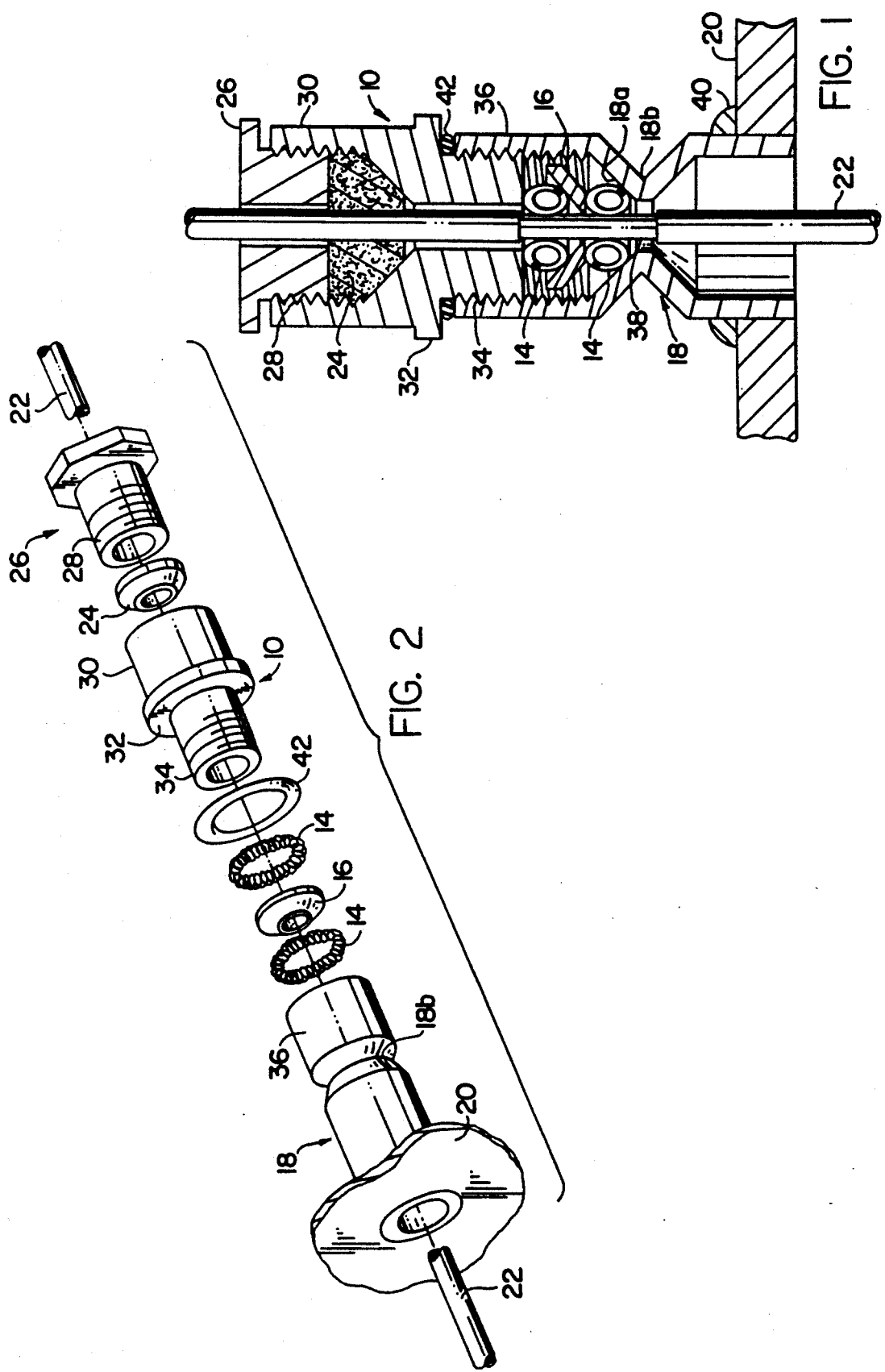

SHIELD GROUND ADAPTER FOR KICKPIPES AND STUFFING TUBES

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates generally to grounding an electrical conduit or cable that passes through an opening in a structural plate member, such as a deck on board ship, having outboard and inboard sides.

(2) Description of the Prior Act

In order to provide a cable through a deck or bulkhead it is generally necessary to both ground the shielding of the cable to the deck or bulkhead, and to assure that this ground connection is adequately sealed against the hostile environment commonly found aboard ship. Typically, iris springs or rings are provided in contact with the cable shielding in order to create a low impedance path from the shield to ground. Illustrative of the prior art employing this approach is the commonly assigned U.S. Pat. No. 4,904,826 to D. S. Dixon entitled "Internal Shield Ground Adapter for Kickpipe Stuffing Tube". Current must travel through these springs and possibly through threaded interfaces before reaching the ground plane afforded by the deck or bulkhead. A threaded gland nut exerts an axial compressive force on the iris springs. Annular packing material is provided in the same general area so that the gland nut axially compresses the packing for a watertight seal. The iris springs are also compressed by the same nut and therefore may not provide an adequate low impedance path from the cable shielding to ground. Should the nut be torqued to the extent required for achieving adequate pressure on the packing to obtain an environmentally effective seal, the springs can be crushed and the cable shielding will not be grounded to the extent required.

Another aspect of the prior art is illustrated by the Federal Republic of Germany, Patent 29 32 612, assigned to Siemens, AG, which appears to avoid crushing of a ring shaped cable grounding means by the use of two gland nuts, one on each side of the ground plane. The configuration disclosed therein causes difficulty for access in connection with maintenance, difficulty in installation, and is generally complex. Moreover, that configuration interjects threaded joints between the cable shielding and the ground plane, and therefore, is vulnerable to deterioration by corrosion, especially in a marine environment. Furthermore, threaded joints do not provide a reliable environmental seal.

There is high importance connected with reliably grounding the shielding of a cable to the ground plane in marine, and particularly naval marine, environments. High electromagnetic (EM) energy from sources such as lightning, electromagnetic pulse (EMP) signal systems, microwave systems, and radar systems cause high level currents and voltages to be induced on the exposed cable shields. This energy must be shunted to the ground plane before it propagates to equipment to avoid degradation of equipment performance or equipment damage. Such shunting is usually implemented where a cable passes through a metallic boundary, thus preventing the EM energy from entering the protected space inside the boundary.

SUMMARY OF THE INVENTION

In accordance with the present invention a stuffing tube or kickpipe is provided in electrical contact with the bulkhead or deck so as to define an upstanding tubular boss. This boss, adjoining its upper end, has a female threaded section. Adjacent to the female threaded section, the tubular boss forms a radially inwardly directed necked-down portion which in turn defines an upper tubular boss chamber whose bottom forms a downwardly directed virtual apex frustoconical resist surface. Axially compressible radially expandable cable grounding iris, or toroidal, springs together with a spacer provide a conductive path from the shielded cable to the metal kickpipe. An elongated annular adapter nut is threadably received in the boss and compresses the iris springs to assure electrical contact with the shielded cable. The cable extends through a central opening provided in the adapter nut and a packing material is provided in axially spaced relationship to the iris springs in a cavity defined by the adapter nut. A gland nut is threadably received in the adapter. The gland nut can be torqued to compress the packing in its own cavity for assuring an environmental seal between the cable sheath and the adapter. The environmental seal is located in axially spaced relationship to and independent of the cable grounding iris springs, and the iris rings providing contact between the cable shielding and the frustoconical resist surface are independently maintained in a state of predetermined compression including a radial component of compression that insures a reliable electrical conductivity path between the cable shielding and the kickpipe. The state of predetermined compression of the iris rings is provided by predetermined torquing of the adapter nut.

BRIEF DESCRIPTION OF THE DRAWINGS

FIG. 1 is a sectional view taken through an installation embodying the present invention.

FIG. 2 is an exploded view showing the various component parts as they would be assembled with a cable, the cable being broken away at least in part for clarity.

DESCRIPTION OF THE PREFERRED EMBODIMENT

Turning now to the drawings in greater detail, FIG. 1 shows a cable 22 extending through an opening in a deck or bulkhead 20. Such cables are commonly used to connect inboard, below deck, equipment to associated outboard equipment above deck. It is imperative that the cable be suitably grounded so as to avoid transmitting electromagnetic pulses and currents picked up by the cable through its shielding.

The cable shielding 38 must be grounded to the deck, and this is generally accomplished by providing a stuffing tube or kickpipe 18 in the deck opening for receiving the cable 22.

In the prior art, a gland nut would be provided in a female threaded section of the kickpipe and the entire assembly compressed to assure the desired ground connection and to seal the resulting assembly from the hostile outboard environment (see the above discussed, U.S. Pat. No. 4,904,826, to D. S. Dixon).

In accordance with the present invention the electrical ground connection is achieved in a more efficient fashion, and without any packing material provided around the shielded area of the cable. With particular reference to FIG. 1, the conventional kickpipe 18 forms a downwardly directed virtual apex frustoconical resist surface 18a which is defined by a radially inwardly directed necked-down portion 18b (FIG. 2, only) of the kickpipe boss. One or more iris rings, or toroidal springs 14,14 are provided around the exposed cable shielding 38. A spacer or tapered washer 16 is preferably provided between the two iris springs shown. An elongated annular adapter nut 10 can be threadably received inside the female threaded portion or section of the kickpipe and rotated to a limit define as a predetermined torque, to thereby achieve a desired predetermined axial compression of the iris spring assembly. These iris springs will when compressed axially be in a predetermined state of compression including a radial component of compression, and will act against the frustoconically-shaped surfaces defined by the kickpipe flange and by the spacer. Their state of radial compression will afford good electrical contact with both cable shielding 38 and the kickpipe. The torque applied to the adapter nut 10 is limited in order to afford the desired degree of compression for the iris springs and the resulting radial force on the cable sheathing and kickpipe.

No packing material is provided in the above described area of the kickpipe, and instead the adapter nut 10 itself defines an upwardly open cavity which cooperates with the cable 22 to provide an annular space that can be conveniently packed with the sealing material as indicated generally at 24. In order to compress this packing material 24 a gland nut 26 is threadably received inside the adapter nut 10, and it will be apparent that sufficient torque can be applied to the gland nut 26 so as to compress the packing material 24 and provide an adequate seal between the cable 22 and the exterior environment for the assembly. The whole environmental seal scheme between the outboard and inboard sides of the deck 20 includes the kickpipe 18 being welded to the deck 20, as indicated by fillet 40, and the provision of a gasket ring 42 of appropriate gasket material.

In summary, the kickpipe 18 has a central opening for receiving the cable 22 and the cable 22 extends through the entire assembly. The cable sheath must be cut away to expose the cable shielding as indicated generally at 38 in FIG. 1. Kickpipe 18 is secured to a deck 20 by welding, which forms a fillet 40. An axially compressible radially expandable cable grounding means preferably comprises at least two iris springs and a spacer 16. Such a grounding means provides a low impedance conductive path from the shielded cable to the metal kickpipe. These components are provided inside the upper end of the kickpipe boss 36 which is internally threaded so as to receive a male threaded portion 34 of the elongated annular adapter nut 10. The adapter nut has an inner end which engages one of the springs 14 so as to compress that spring against the spacer 16 and to compress the lower spring 14 between the spacer 16 and the frustoconical resist surface 18a of the kickpipe.

Gasket ring 42 is provided between the upper end of the kickpipe 36 and a flange 32 provided on the adapter nut 10 for the purpose of the environmental seal, as heretofore mentioned.

The adapter nut 10 defines an upwardly open cavity which communicates with a central opening in the adapter nut for receiving the cable 22 as best shown in FIG. 1. The adapter nut cavity is provided with a packing material 24, which packing material is so shaped that the gland nut 26 can be threadably received inside the adapter nut for compressing the packing material 24 and providing a tight seal around the cable 22. Thus, the gland nut 26 is threadably received in the female threaded upper portion of the adapter nut 10 providing adequate clamping action on the packing material 24 assuring that the controlled clamping torque exerted on adapter nut 10, which in turn controls the state of compression of iris springs 14,14, will not be exceeded in achieving adequate sealing of the assembly by the gland nut 26.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a kickpipe assembly of the type adapted to be secured to a plate having an outboard side and an inboard side, the kickpipe including a tubular boss for upstanding from the outboard side of the plate, the boss having a single threaded section and a radially inwardly necked-down portion adjacent to the threaded section, the kickpipe assembly further including an axially compressible radially expandable cable grounding means in said boss for forming a conductive path between a shielded cable when said cable extends axially through the kickpipe assembly, the improvement comprising an adapter having a first portion threadably received in the single threaded section of the tubular boss for exerting an axial force on said axially compressible radially expandable cable grounding means, said adapter defining a second threaded section spaced axially from the first portion, and a gland nut threadably received in said second threaded section of said adapter, packing material provided in an annular cavity defined by said adapter, said gland nut serving solely to compress said packing material, whereby the adapter is threaded into the single threaded section of the kickpipe boss for compressing the radially expandable cable ground means.

2. The combination according to claim 1 wherein said adapter defined cavity has a frustoconical surface oriented to achieve a seal between said packing material and the cable in response to compressing of said packing material by the underside of said gland nut as it is threadably received by said second threaded section of said adapter.

3. The combination according to claim 2 wherein said axially compressible radially expandable cable grounding means includes at least one iris spring, whereby the reliability of the conductive path between a shielded cable extending through the kickpipe assembly is enhanced by the inherent resilience of the iris spring.

* * * * *